March 17, 1953     D. W. BARKLEY     2,631,498
PRISMATIC ANTIGLARE REARVIEW MIRROR DEVICE
Filed July 9, 1951     3 Sheets—Sheet 1

Inventor
Dwight W. Barkley
Nobbe & Swope
Attorneys

March 17, 1953     D. W. BARKLEY     2,631,498
PRISMATIC ANTIGLARE REARVIEW MIRROR DEVICE
Filed July 9, 1951     3 Sheets-Sheet 3

Inventor
Dwight W. Barkley
Robbe & Swope
Attorneys

Patented Mar. 17, 1953

2,631,498

UNITED STATES PATENT OFFICE 2,631,498

PRISMATIC ANTIGLARE REARVIEW MIRROR DEVICE

Dwight W. Barkley, New Kensington, Pa., assignor to Libbey-Owens-Ford Glass Company, Toledo, Ohio, a corporation of Ohio Application July 9, 1951, Serial No. 235,790

9 Claims. (Cl. 88—77)

This application is a continuation-in-part of my application Serial No. 788,120, now abandoned, filed November 26, 1947, for "Prismatic Rear View Mirror Device."

My invention relates to a prismatic rear view mirror device which provides the automobile driver with a personal selection of three or more images of the rear road conditions which vary in sequence in intensity, and may vary in color as desired. The invention permits the driver to make a choice of the images of various brightnesses, each image being of the common limited rear field of view, so as to obtain maximum visibility with the minimum glare best suited to his particular personal eye glare tolerance and visual acuity under all the varying light intensities present under modern night and day driving conditions.

Prior automobile rear view mirrors have had to be designed with reflectivities which gave a reasonably acceptable comprise for most drivers between glare elimination and visibility. Thus, lead sulfide rear view mirrors which have a reflectivity of about 30%, which represent by far the greatest number of rear view mirrors in use today, are objected to by many drivers as producing intolerable glare in night driving while many others consider their reflectivity as too low for day driving.

The first purpose in the use of a rear view automobile mirror is to provide seeing ability of the rear road under the various conditions of driving. For day driving a reflectivity of over 30%, preferably in the range of 40% to 60%, is quite useful. For night driving, however, lower reflectivities are necessary to prevent glare. A mirror of reflectivity between approximately 10% and 30% has been found to provide ideal glare removal while providing excellent rear road visibility for most drivers. The provision of a rear view mirror for night driving with a single fixed reflectivity in this range as done in the prior used rear view automobile mirrors has represented a compromise which has been unsuitable for many drivers due to the great variation in the ability of human eyes to withstand glare and in the ability to see at various light intensities, and has also been unsuitable for preventing glare from extremely high light intensity conditions. Thus, prevention of glare from the headlights of high intensity beams of a closely following car upon a hilly or uneven road has represented a condition that no normally useful compromise mirror reflectivity of single value could be expected to handle, and otherwise be useful generally in night driving.

The mirror device of this invention provides for such abnormal driving conditions as well as normal dry and night driving and for the wide variations in eye sensation of automobile drivers by providing at least three or more intensities of images of the rear road conditions, which the driver may select as the rear lighting conditions and his eye sensitivity to glare and visibility vary. The choice of image intensity suitable to the driver is made by his selectively positioning the prismatic rear view vehicle mirror by angular adjustment to alternatively locate the various images of different intensities in a continuous sequence of such intensities of the same limited common field of rear view in the normal line of sight of the driver as he sits in driving position in the car.

The rear view mirrors of this invention may provide a choice of at least three or more progressively lower image intensities in sequence which may be, for example, one of over 30% in all cases, another between 4% and 30% approximately, and a further one of 1% up to 12% approximately of the incident light falling upon the rear view mirror and coming from the rear view of the road, etc. A fourth image of an intensity of 4.5% or less may also be secured and in some forms of the new mirror device may be chosen by the driver under extreme conditions, such as temporary night use to block out intense rear headlights while maintaining some vision of the same and the road.

While the rear view mirror of this invention thus provides at least three different light intensities of images of the rear road and traffic conditions, it will be obvious that all drivers will not necessarily select the same image intensity for driving under similar road and lighting conditions, since each will select an image intensity that best suits his particular eyes under the existing condition. Thus, while the brightest image might generally be used by most drivers during day driving it would appear that due to the wide difference in human eyes that many drivers in order to avoid day glare would prefer to use in day driving the reflected image from the mirror which falls in the 10% to 30%, approximately, range. With most drivers this range would be used in normal night driving. Further, when driving in daytime under snow glare conditions it would appear that the driver would use the third image of still further reduced light intensity to offset such glare conditions. Many drivers would also use this third range of image intensity for normal night driving as giving them best glare reduction, although such image might more generally be used by a larger group of drivers mainly under intense glare conditions at night due to high intensity lights upon a closely approaching rear car and particularly under the bad glare conditions that occur upon rainy night driving. Regardless of the wide variation in driving conditions and individuals' sight and glare sensations, it will be apparent that the prismatic rear view mirror device of this invention provides a selection of different intensities of the image of the rear road and lighting conditions which may be quickly and conveniently chosen by the driver by a simple movement so as to provide an image intensity of the rear view best suited to the individual's reactions.

The present construction also provides for the production of multiple images, two of which may differ in color effect, while the light intensity of the differently colored images may be substantially different as desired.

One of the objects of the invention is to provide a mirror of the prismoidal type which is particularly useful as a rear view automobile or vehicle mirror which provides a multiple selection of at least three reflected images which vary progressively in intensity, and wherein the front, partially transparent mirror reflective means is of a high reflectivity of over 30% such as to make the front mirror particularly suitable for day driving.

Another object of the invention is to provide a rear view mirror of prism form comprising two reflective mirror means disposed at an angle to each other and providing at least three images of various progressive intensities each separately visible from the face side of the mirror.

Another object of the invention is to provide a rear view automobile mirror of prism form offering a choice of at least three different intensities of images of the limited common rear field of view having means for angularly adjusting to predetermined positions so as to selectively locate in the predetermined position of the driver's eyes the first, second, third and further images of the common rear field view.

Another object of the invention is to provide automobile rear view mirrors of the type indicated having the desired multiple reflectivity ranges in which the separate images are not only of different intensities but are colored or differently colored.

Various other objects will be apparent from the following description.

The preferred embodiments of my invention are illustrated in the accompanying drawings, wherein similar characters of reference designate corresponding parts, and wherein.

The improved mirror of this invention comprises at least two mirror reflecting means associated with each other and arranged, one behind the other, with either their lower or upper edges in converging relationship and with the other edges more widely spaced apart. Thus the mirror reflective means deposited upon front and rear supporting surfaces are arranged in an non-parallel relationship to provide a prism or a support of prism form. In all forms of the present invention, the front mirror means is partially transparent and is of over 30% and of up to 70% reflectivity substantially and provides the image directly thereon which is the brightest or of the highest reflection intensity.

As a suitable support for the mirror reflective means or coatings, I may employ transparent bodies such as glass or plastic prism or sheets of the same arranged in prism forms, the sheets being held in close and fixed or fastened angular relationship by a frame. While the portion of the prism form between the front and rear reflective means must be transparent, it will be evident that in some forms of the invention such as those shown in Figures 8, 10 and 12 the rear glass or other sheet support need not be transparent. It will be apparent that the surfaces of the support which are to carry the various reflective means or coatings must be smooth and polished in order that such surfaces coated with the mirror reflective means will provide true mirror image reflections.

The angle between the two mirror reflective means which form a front and a rear mirror disposed at such angle to each other is preferably of the order of 3¼ degrees, although there may readily be used an angular separation between the two mirrors of from 2 to 10 degrees or more. The smaller angular separations are preferable where the solid prism supports are employed and the larger angular separations of close to 10 degrees are preferable and give somewhat more convenient operation when a prism form composed of glass sheets is used. As will be apparent from the drawings and the operation of the mirror device, it may be employed with the narrow end of the prism form either up or down.

The arrangement of the two reflective surfaces in accordance with the invention will be more clearly apparent from the drawings.

Figure 1:
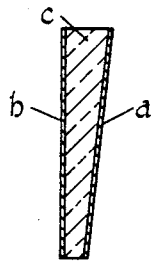
Figure 1 is a vertical sectional view through a mirror made according to the invention in which a wedge-shaped piece of glass or prism is employed as the support.

In Figure 1 there is illustrated one form of the invention. In this instance, the mirror is provided with a front partially transparent mirror reflective film $a$ and a rear mirror reflective film $b$ carried by a support body $c$, which is formed of glass or other transparent material, and which is wedge-shaped in cross section, the angle between the surfaces of the body carrying the reflective films $a$ and $b$ being indicated at $m$. The rear mirror film is highly reflective, and as a coating on a plain sheet of glass would have a reflectivity ranging from 30% to 95% or more.

In general, the front reflective means $a$ in my various mirrors is semi-transparent and preferably of substantially no light absorption. In my mirrors the front mirror reflective means $a$ will be of over 30% and up to 70% reflectivity substantially in all cases and will be employed largely as a day driving mirror. The rear reflective means $b$ is preferably opaque, although it may also be semi-transparent, preferably of less transparency, however, than film means $a$. If the film means $b$ is transparent it may or may not be backed with an opaque coating. Also, if mounted in a frame, as shown at 1 in Figure 2, the back side of the frame can serve as an opaque medium for backing of the rear film means $b$, if it is partially transparent. If desired, the back of the frame may be coated on its inner surface with a suitable opaque light absorbing paint.

Figure 2:
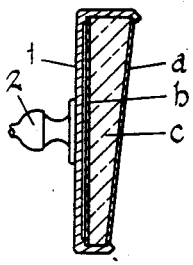
Figure 2 is a similar view showing the mirror mounted in a frame and provided with means for shifting the mirror angularly to provide a separation of the various images of different reflected light intensities.
Figure 4:
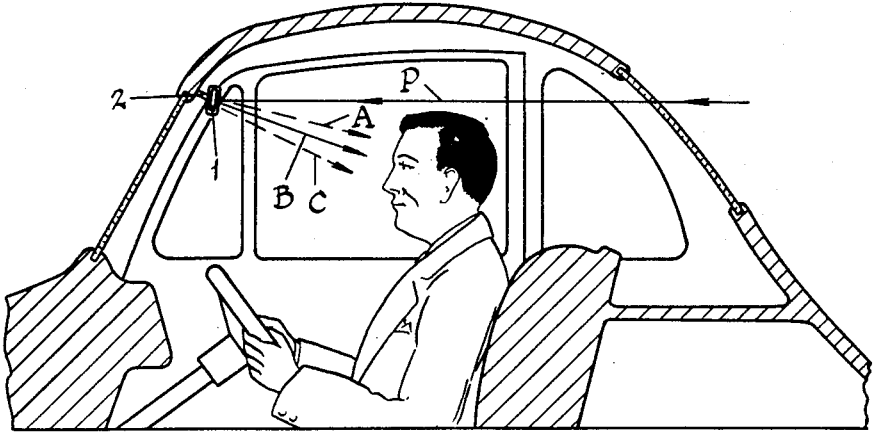
Figure 4 is a diagrammatic view showing how the mirror is used in an automobile.
Figure 16:
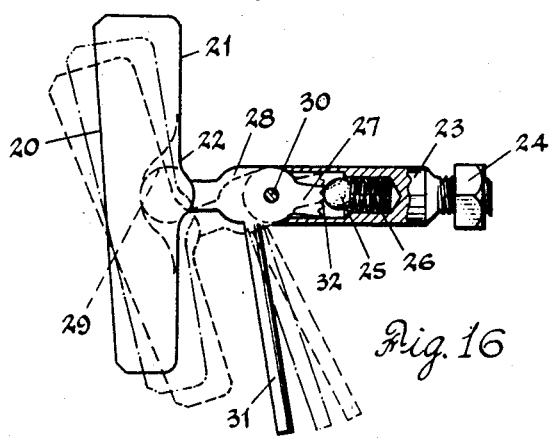
Figure 16 shows a form of the mirror device which provides means for step-by-step angularly adjusting or shifting the device to provide a multiple selection of images and make each separately visible to the automobile driver.

In Figure 2 the mirror of Figure 1 is shown in frame 1 which carries the prism $c$ and which frame is provided with a universal joint 2 such that step-by-step angular adjustment of the mirror device may be secured where the mirror is thus supported as shown in Figure 4 in a suitable position in the automobile. This stepwise angular adjustment may be secured in other ways, such as is shown in Figure 16, and in all cases it functions to permit the driver to selectively focus alternatively to his eyes the images of differing light intensities of the limited common rear field view as indicated by the various rays in Figure 4, namely, A, B, C, etc., which images are formed by incidence of light upon the mirror as shown by line P. By properly tilting the mirror the lines A, B, C may be selectively brought to the level of the driver's eyes so that he will see the image from the front mirror reflective means $a$ or the image from the rear reflective means $b$ as modified by the light transmission of the front mirror reflective means, or a multiple reflected image arising from internal reflections within the prism form.

Figure 5:
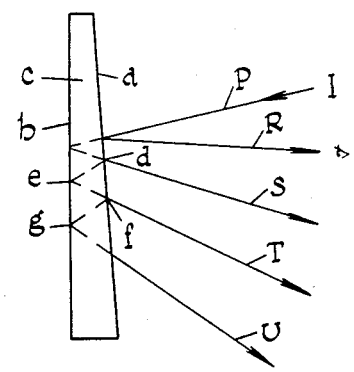
Figure 5 is a diagrammatic view of the mirror showing how the mirror provides a reflected image from the front mirror surface coating visible to an observer at the point shown.
Figure 7:
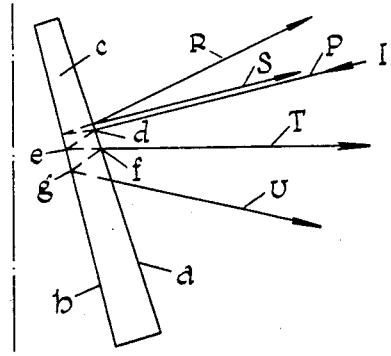
Figure 7 is a further similar view of the mirror showing how a third and other additional reflected images are formed by reflection from the rear mirror reflecting means by internal reflection within the prism form by cooperating reflection from the front mirror reflection means.
Figure 6:
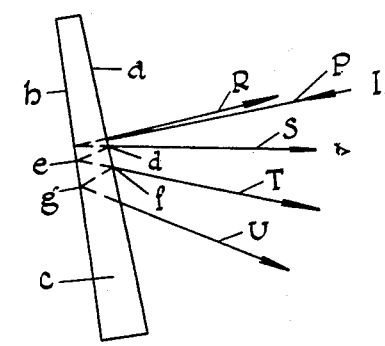
Figure 6 is a similar view of the mirror showing how a reflected image visible to the observer is formed by reflection of light from the rear mirror reflecting means and modified by the light transmission or light reflection properties of the front mirror reflecting means.

Figures 5, 6 and 7 will more clearly bring out how the various reflected beams originate and are separated within various forms of the rear view mirror and how the selective stepwise tilting or angular adjustment of the prism form, as shown in the successive figures, operates to focus the various selected reflection beams. Thus in these figures the light incident upon the mirror device, originating from the object I, is reflected as the several image beams R, S, T, U, etc., which are in sequence of progressively lower intensities. In each of the figures, beam R is the brightest reflection and is a reflection directly from the front mirror means $a$ or front mirror and is of over 30% and up to 70% substantially. This is shown as reflected to the driver's eyes in Figure 5, but in Figures 6 and 7 it is reflected into the car above the driver's eyes and is not visible to him. The beams S, T, and U in Figure 5 are reflected below the driver's eyes so that he clearly sees the reflected beam R only.

In Figure 6 the reflected beam S alone reaches the driver's eyes, and in Figure 7 the mirror device has been shifted angularly further to bring reflected beam T into the driver's eyes. In Figure 6 this same beam T is below the normal line of sight of the driver. The selective shifting indicated in Figure 7 brings beam T only into the driver's eyes, and brings the other reflected beams R and S out of line with the driver's eyes and reflects the same into the top of the car. Further stepwise shifting of the prism device might be employed to bring the beam U, shown in Figure 7, into the driver's eyes when such further reflected beam of reduced intensity is desired for the driver's use. The vertical line appearing in each of the Figures 5, 6 and 7 serves to indicate a relative degree of angular shifting of the prism form in those figures.

In each of Figures 5, 6 and 7, it will be noticed that the reflected beam R, which is of 30% to 70% substantially, originates by reflection from the front mirror means $a$. Likewise, the reflected beam S results from the first reflection from the rear mirror means $b$. Such beam, however, passes through the front mirror means $a$ twice and is modified by the light transmission of such front mirror means. The incident light is decreased in intensity by the light reflection properties of the front mirror means $a$ primarily, the absorption of reflective means $a$ being preferably but not necessarily substantially negligible. Thus the incident light is reduced by the reflection of beam R so that not all the incident light reaches the rear reflective means $b$. The reflection ability of the rear reflective means $b$ then determines the amount of light returned forwardly but before the reflected beam issues from the prism form, a further reflection occurs at point $d$ by the front mirror means. Thus the beam S is of a reduced intensity as compared to the incident beam.

In Figures 5, 6 and 7 the origin of beam T will be seen to be by internal reflection within the prism form by the cooperative action of the front mirror means $a$ and of the rear mirror reflective means $b$. Thus the incident beam after reduction in intensity by light reflected as ray R by the front mirror means $a$ passes to the rear mirror reflective means $b$ and is reflected back therefrom. As just explained above, this reflected ray passes out of the mirror as beam S but in doing so is subject to partial reflection at point $d$ by the front mirror means. Thus the incident light is further reduced by the loss of ray S before the internally reflected light arrives back at the rear mirror reflective means again and is reflected again at point e. Such reflection again exerts a reduction in intensity and a further reduction in light intensity of the beam T occurs as some light is again reflected at point f as the beam passes through the front mirror means a.

Obviously still further reflected image beams of reduced light intensity may be formed by internal reflection and cooperative action of the front mirror reflective means and rear mirror reflective means as shown by beam U which is reflected rearwardly from front mirror a at f and reflected forwardly by rear mirror b at g.

If a mirror is made in which the front mirror reflecting means or front mirror gives a first image reflection falling in a range of 10% to 30%, it is found to give a second image of over 30%. In the various mirrors made under this invention, on the other hand, the front mirror reflective means or mirror is necessarily of over 30% reflectivity and provides a first image of over 30% and the second image falls within the 4% to 30% range. Besides such reversal in functioning, it is also found from comparative examination of the various mirrors that whereas the third image intensity in the mirrors with front mirror reflecting means of under 30% was found to increase as the front mirror reflectivity was increased up to 30%, the third image intensity is found to decrease in the examples of mirrors of this invention as the front mirror reflectivity is further increased beyond 30%. As the image intensities of the second and third, etc. images increase in all cases with higher reflectivity in the rear reflective means or mirror, it is apparent that such a comparison will be most obvious with mirror constructions in which the rear mirror reflectivities are the same or approximately comparable. Thus, entirely different values of third image reflectivity result in the mirror constructions when the front face or front reflective means is of over 30% reflectivity than would be expected upon the basis of the mirrors having lower than 30% reflectivity on the front face. While this does not result in any different sequence of the first, second, third, etc. images as formed by the mirror as illustrated in Figures 5, 6 and 7, it does clearly result in a difference in sequence of the relative brightness or intensities of image as the mirror is angularly adjusted. Thus, with mirrors having a front mirror of less than 30%, the first image is of less than 30%, the second image is of over 30% and the third image of 4.5% to 12% approximately, with subsequent images of further reduced intensity. On the other hand, in the mirror examples as made under this invention with a front mirror of over 30%, the order of sequence as the mirror is progressively shifted angularly is from a first image of over 30%, to a second image of between 4% and 30% approximately, to a third image of between 1% and 12%, and then to succeeding further images of further reduced intensity. Thus, the mirrors of the invention have the definite advantage that the angular adjustment brings into focus for the driver images of progressively reduced intensity, leading to simple and non-confusing use by the driver.

Figure 3:
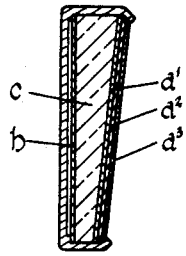
Figure 3 is a vertical sectional view through a mirror made according to the invention in which the front mirror reflecting means on the support is composed of multiple films or layers.

In Figure 3 the mirror form shown illustrates the use as one of the reflective mirror means of a multiple layered reflector. In this figure a prism c is coated on the rear with a mirror reflective means comprising a coating b and in which the front mirror reflective means is composed of two or more reflective layers such as the three layers shown at a1, a2, and a3 which mutually act together to form a transparent reflective mirror means which give a reflection of 30% to 70% substantially. Obviously, the rear mirror reflective means b may also be built up of more than one reflective coating which act together and in which one or all of such coatings are partially transparent. Coatings a1, a2 and a3 should preferably be free of substantial light absorption when used in the front mirror reflective means and the refractive index and thickness of such layers must be of a character that the desired reflectivity and color are secured. Such multiple coatings are thus of a character that they cooperate through light interference effects to give the desired reflective mirror means.

In place of the solid prism, I may use two pieces of flat glass as the carriers or supports for the two mirror films or reflective means. As shown in Figures 8 to 13, the two pieces of glass will be disposed one behind the other and at a suitable angle to form a prism structure which will function similar to that of Figure 1. Various arrangements of the mirror front and rear reflective means can be provided as shown in Figures 8 to 13.

Figure 8:
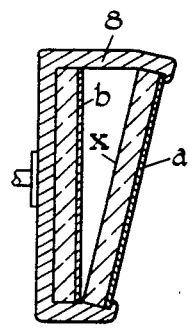
Figure 8 is a vertical sectional view through a mirror made of two pieces of glass disposed at a selected angle, with the frame holding the pieces together to form a prism, and in which the front and rear reflecting means are arranged upon the two pieces of glass in the selected manner shown.

Thus in Figure 8 I show two flat pieces of glass which are disposed at a suitable angle in a frame 8. The front glass carries a mirror film a on its front surface and the rear glass carries a mirror film b on its front surface.

Figure 9:
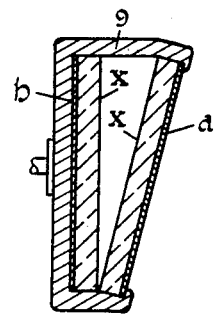
Figure 9 is a similar view showing a different arrangement of the front and rear mirror reflecting means.

Figure 9 shows a similar arrangement in which two flat pieces of glass are carried in a frame 9. In this instance the front glass carries a mirror film a on its front surface and the rear glass carries a mirror film b on its rear surface.

Figure 10:
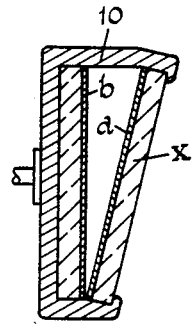
Figure 10 is a similar view showing another different arrangement of the two mirror reflective means.

In Figure 10 the two pieces of glass are disposed in similar angular position in a frame 10. However, the front glass carries a mirror film a on its rear surface and the rear glass carries a film b on its front surface.

Figure 11:
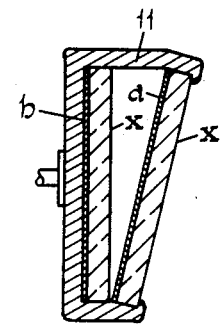
Figure 11 is a similar view of still another arrangement of the mirror reflective means.

In Figure 11 still another arrangement of the films is shown. In this case the two pieces of glass are held at a desired angle in a frame 11. The front glass has a mirror film a on its rear surface and the rear glass also has the mirror film b on its rear surface.

Such arrangements utilizing two flat pieces of glass tend to give some lack of clarity in use, due to faint but slightly disturbing reflections occurring at the plain uncoated glass surfaces in addition to the images formed upon the desired mirror surfaces. Such plain uncoated surfaces are designated by the letter x in each of Figures 8 to 11 and 13. This can be minimized or prevented and high clarity mirrors secured if the glass surfaces marked x in these figures are treated beforehand with a transparent thin deposit of material such as calcium or magnesium fluoride applied in the known manner to make these glass surfaces essentially non-reflective but still transparent.

The use of the solid prism also avoids such troubles and the reflection from either mirror surface a or b, in Figure 1, is of the very high clarity characteristic of first surface mirrors, since in neither case is there any slight ghost reflections to cause visual confusion.

Figure 15:
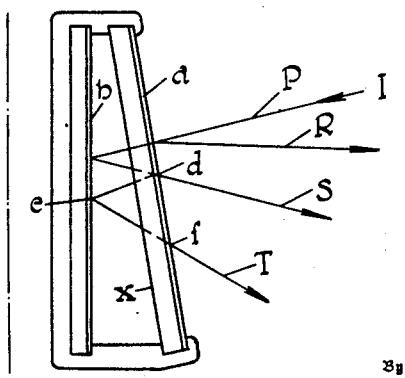
Figure 15 is a similar diagrammatic view showing the various reflection paths of light from an image as occur with the mirror shown in Figure 8.

In Figure 15 there is shown a diagram which shows the origin and separation of the various reflected images as they are formed in the use of the mirror of Figure 8 when reflection at the surface x has been reduced to a negligible degree. In this case, Figure 15 shows the mirror of Figure 8 inverted, with the wide edge down. It will be understood that the position of the mirror in use may be with its wide edge either up or down, as desired.

Figure 12:
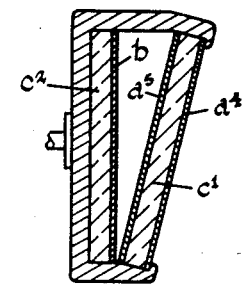
Figure 12 is a similar view showing a further arrangement of the rear and front reflective means in prism form in which a semi-transparent coating on each side of the front transparent member operates together as the front mirror reflective means.
Figure 13:
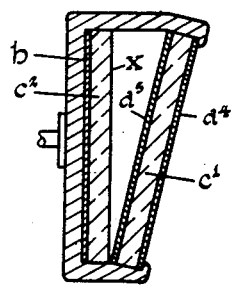
Figure 13 is a somewhat different arrangement of mirror films in the rear view mirror device of a generally similar nature to Figure 12.

In Figures 12 and 13 the mirror constructions involve the use of two pieces of flat plain surface glass or other support which are disposed at a suitable angle in a frame so as to provide a prism form. In each of these the front glass has a transparent reflective mirror coating on each side as shown by films $a4$ and $a5$ to provide a structure which operates as a front reflective means. In such construction as shown in Figures 12 and 13 the front transparent member or glass plate $c1$ is preferably chosen such that the two faces of the same are substantially parallel in order that the reflective means thus formed on the member $c1$ by coatings $a4$ and $a5$ will operate jointly to provide images which are substantially single and lie upon each other. In Figure 13 the rear reflective mirror coating $b$ is shown as on the rear surface of glass piece $c2$. Obviously the rear reflective means might be made of a transparent rear support having coatings upon its two opposite supporting surfaces.

Figure 14:
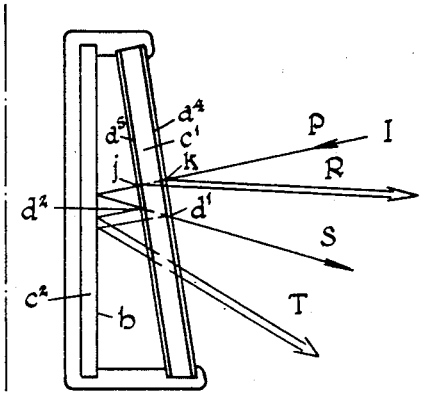
Figure 14 is a diagrammatic view showing how the mirror of Figure 12 provides reflected images of various light intensities.

The origin of the reflected beams and their separation in the forms of the mirror device of the types shown in Figures 12 and 13 will be apparent from Figure 14 in which the functioning of the mirror of Figure 12 particularly is shown. Thus it will be seen that the incident beam of light coming from the image I is reflected from the front mirror means at both coating surfaces $a4$ and $a5$ at points $k$ and $j$ respectively. The separation of the two beams thus reflected as beam R is negligible when the front glass member is thin and the two surfaces are substantially parallel as shown. While ray S is returned as a unitary ray, it is seen that by reason of the internal reflections at points $d1$ and $d2$ by the two coatings $a4$ and $a5$ respectively provided on the front support member $c1$, the reflected ray T is in a similar manner to ray R composed of two very slightly displaced beams of negligible separation. Thus rays R and T, while composite, are each found to give an essentially single image to the driver and to be of good clarity, practically free of haziness. It will further be noticed that the slight separation in the composite beams R and T is merely a parallel type of displacement and not of the angular type of displacement which permits the separation and selection of the reflected images along lines R, S, T, etc.

In the two mirror forms of Figures 12 and 13 the coatings $a4$ and $a5$ can, for example, be clear non-light-absorptive coatings of titanium dioxide of equal thicknesses upon a glass sheet and providing together a front mirror reflective means or mirror of 36% reflectivity. In such constructions the use of coatings on the two sides of a given member of similar reflectivities is preferable as further acting in producing only one apparent image in the reflected composite images or beams R and T.

In Figure 16 there is shown a complete rear view mirror in which one of the prismatic mirrors above described is indicated at 20 and is fixedly supported in a case 21 having a ball socket bearing 22 in the back to permit preliminary adjustment of the mirror to bring an image to the driver's eye when he is seated in the car. As shown, a fixed base in the form of an arm 23 with a locking nut 24 provides means of permanently attaching the mirror to the car. Within a recess of such arm a ball bearing 25 held in position by a spring 26 acts as a locating means for a simple ratchet lever 27 comprising the other end of the intermediate connecting arm 28 carrying the ball support 29. Such intermediate arm is pivoted as indicated at 30 to the fixed arm to permit some rotation which the driver may easily cause by movement of the lever arm 31 attached to the arm 28. Thus the mirror may be angularly adjusted to fixed predetermined positions as limited automatically by the recesses 32 becoming aligned with and receiving ball 25. Recesses 32 are provided so that the automobile driver by a simple movement of the lever arm may alternatively locate and bring into focus with his eyes in the predetermined driving position the first, second, third or further images of the rear field view without other adjustment of the mirror.

The operation and construction of the holding frames illustrated diagrammatically in Figure 16 is more particularly set forth in the inventor's copending application, Serial No. 788,119, filed November 26, 1947, now Patent No. 2,588,792, issued March 11, 1952.

For my back mirror reflective means or coating $b$ I have found that any material having a high specular reflectivity of 30% to 95% or more may be used. Thus, silver and aluminum of 90% reflectivity are found to be excellent for this purpose. By coating aluminum with a quarter wave length thickness coating of a low index material such as magnesium fluoride and a further quarter wave length thickness of a high index material such as zinc sulfide or titanium dioxide a multiple coating showing approximately 95% reflectivity may be secured and such a multiple coating may be used as a rear reflective means in my mirrors with advantage as higher reflectivity in the rear reflective means increases generally the brightness of the second, third and further images. I may also use magnesium, having a reflectivity of 73%; platinum, having a reflectivity of 63%; iron, having a reflectivity of 55%; chromium, having a reflectivity of 55%; nickel, having a reflectivity of 60%; and rhodium, having a reflectivity of 75%. I may use other materials such as cobalt, iridium, indium, antimony, molybdenum, palladium, cadmium and other silvery appearing metals. I may also use opaque lead sulfide, mirror films of 30% reflectivity or transparent quarter wave coatings of titania of 30% to 35% backed with opaque paint.

I may also use for my back reflective means or mirror coating $b$ colored reflectors, such as gold of 60% to 80% reflectivity, or copper of 55% to 75% reflectivity. I may secure such variations in reflectivity value with these or the other metals already given by varying the thickness of such metallic film. I may choose to use a thin film of partially transparent gold backed by an opaque silver mirror.

Further, I may also use semi-transparent reflective layers, as the mirror film $b$, which are colored by light interference effects as disclosed in United States Patents Nos. 2,394,533; 2,430,452; 2,519,545; and 2,519,546.

The use of a colored reflective rear surface reflective mirror means or coating $b$ does not of course give any coloration to the front mirror reflection, but does control the color of the reflecting mirror means $b$ and of the images originating thereon. The color of the mirror image reflections coming from within the prism form and the general reflectivity intensity of such reflections may also be colored and affected by the use of a colored prism or of colored glass plates. Also, if reflection from the front surface mirror film *a* is colored by selective reflection or by interference effects, not only is the reflection from this surface colored, but a color is imparted to the mirror reflection from film *b*, by reason of the selective colored light transmission of this semi-transparent coating *a*. Thus, my mirror may not only give colored reflections but the several reflections in the different positions of use do not of necessity appear of similar color but are frequently of different colors as well as of different reflectivities.

As suitable materials for the reflective coatings employed in forming the front reflective means I may use by way of example a semi-transparent reflecting coating or coating means of or including as a layer a metallic oxide such as titanium dioxide, antimony tetraoxide or pentaoxide, chromium sesquioxide, zirconium dioxide, tungsten trioxide, aluminum sesquioxide, beryllium oxide, stannic oxide, or magnesium aluminate or spinel. There may also be used zirconium silicate or zircon. Such materials may be employed directly as single or as multiple coatings as is necessary to provide sufficient reflectivity as hereafter shown. The reflective properties of such coatings vary with the thickness of such coatings and also vary further as light interference effects occur as the thickness is varied. In multiple coatings which operate to give high reflectivity I may also use low refractive index materials in combination with layers of other higher index materials, such suitable low index materials being magnesium fluoride, magnesium aluminum fluoride or cryolite, calcium fluoride, lithium fluoride, or silicon dioxide.

Preferably these reflective coatings for the front reflective means are formed by thermal evaporation within a vacuum, although other methods of deposition may be used, and preferably after the coatings of metallic oxide nature are deposited they are subjected to a heat treatment and oxidation as described in a patent application of A. R. Weinrich, Serial No. 783,841, filed November 3, 1947, now Patent No. 2,578,956 issued December 18, 1951, in which the thermally evaporated coatings are heated in an oxygen containing atmosphere to reduce the light absorption of the thermally evaporated coating to a minimum. Coatings of the above metallic oxide materials may thus be prepared of less than 2% light absorption and generally of less than 1%. By thermal evaporation alone coatings of less than 5% light absorption may be prepared in certain cases.

The semi-transparent coating or coatings which are employed in making the front reflective means and front mirror of my mirrors may be formed of materials such as those just listed above, the thickness of such single coatings or the thickness and arrangement of multiple coatings being such as to provide when deposited upon the front support upon either or both its faces a reflectivity of 30% upwards. Such coatings will frequently provide colored reflections directly from such front reflective means due to light interference by such means and as already indicated this will further affect the color of the other images apparent in the mirror. The construction and use of my mirrors to provide at least three or more images of differing intensities and frequently differing colors and providing an image of over 30% reflection, one of between 4% and 30% approximately and a further image of 1% to 12% or more approximately, will be more apparent from the following examples, which are by way of example only and not an indication of the limitations of such mirror constructions.

*Examples 1 and 2*

Two clean glass prisms having an angle of 3½ degrees between their faces were coated upon their front face with a three-layer reflective means in which the several coatings cooperated to produce the desired front mirror type reflection of 50%. The coatings were deposited by thermal evaporation and comprised a one quarter wave length of green-yellow light thickness in each case of successive layers of titanium dioxide, quartz and titanium dioxide with one of the titanium dioxide layers adjacent the glass surface and each of the layers in intimate contact. The back face of one of the prisms was then coated by thermal evaporation with a coating of reflective silver and the back face of the other was similarly coated with a coating of reflective copper. The reflectivities of similar thickness deposits of these two metals upon otherwise uncoated glass plates was 90% with the silver and 75% with the copper. Prior to the application of the metal coatings to the prisms, the latter carrying the multiple layered front coatings were heated to oxidize and minimize any light absorption in the original thermally evaporated deposits so as to secure the desired multiple layered reflector in a condition of substantially no light absorption. The two completed mirrors when mounted in a suitable frame and fixed in driving position in an automobile gave easily separable multiple images by angular adjustment of the mirror. With the silver backed mirror the first image was of 50% reflectivity or intensity with reference to the incident light, the second image was of 22.5% and the third image was of 10.1%. A fourth image of 4.6% formed by a second internal reflection within the prism form was found to increase the attractive utility of this mirror in driving, since such mirror then had three different image intensities particularly useful for night driving and avoidance of glare. In the rear view mirror having the copper back the three images were of different colors which aided in the selection of such by the driver. The four image intensities provided by this mirror were found to be 50% in the first image, 18.7% in the second image and 7% in the primary image formed by internal reflection within the prism. The fourth image has a value of 2.6%.

*Examples 3 and 4*

Two clean glass wedges of 3¼ degrees between faces were coated on their face surfaces with a 50% mirror reflecting coating exactly as detailed in Examples 1 and 2. The back face of one of the prisms was then coated by thermal evaporation with a reflective coating of chromium. The back face of the other prism was coated by chemical deposition with an opaque lead sulfide mirror coating. These coatings provided back or rear reflector surfaces of 55% and 30% reflectivity respectively. Each mirror provided by slight angling to successive angularly located positions a progression of images of different and of lower intensities in sequence. With the chromium backed mirror, the images in sequence were 50%, 13.7%, 3.8% and 1.0%, while those with the lead sulfide backed mirror were 50%, 7.0%, 1.0%, and 0.2%. These mirrors were quite satisfactory

Example 5

Upon the front face of a glass prism having an angle of 3½ degrees between its faces there was deposited a three-layer coating of titanium dioxide, quartz and titanium dioxide in the manner and of the same respective coating layer thicknesses as formed in Examples 14 and 15 so as to give upon the front face a three-layer reflective means of no substantial light absorption in which the coatings or films cooperated to produce a front reflection of 50%. A multiple layer reflecting rear mirror means or backing was then applied to the clean uncoated rear face of the prism by first evaporating a quarter wave length of yellow light thickness of titanium dioxide upon and in intimate contact with the glass, then depositing by thermal evaporation a quarter wave length of magnesium fluoride upon the first deposited coating layer, and then following this depositing by thermal evaporation upon the fluoride layer an opaque reflective deposit of silver. The multiple layer backing reflective means thus produced as measured upon a flat piece of otherwise uncoated glass produced at the same time carrying the same coatings of titanium dioxide, magnesium fluoride and silver had a reflectivity as a back mirror of the order of 95%. Thus the completed prism mirror in this example had a multiple layer reflective means upon both its front and rear surfaces, each group of layers acting cooperatively within such respective groups to form a front and a rear reflective means which acted as a simple front and rear reflective mirror in my completed mirror. The mirror was particularly attractive in use as a rear view mirror in the automobile in that by slight angular adjustment it offered to the driver a continuous, progressively diminishing choice of five different images which in the first image coming from the face was 50%, in the second image as formed by reflection from the rear mirror and modified by the light transmission of the front mirror was 23.7%, and in the images formed by internal reflection within the prism was in the third image 11.3%, in the fourth image was 5.3%, and in the fifth image was 2.5%. Such mirror thus provided for all the various conditions of driving and for the variations in drivers' eyes so that each could select upon an individual basis an image intensity most suitable for best vision and minimum glare.

Example 6

A clean piece of thin plate glass having substantially parallel faces which was cut to automobile rear view mirror size was coated on both surfaces by thermal evaporation in a vacuum with a titanium dioxide coating, each coating being of a thickness approximately one-quarter wave length of blue light. A second clean piece of plate glass of similar size and shape was coated upon one side by thermal evaporation with an opaque layer of aluminum of high reflectivity of 85%. The two coated glass plates were then adjacently positioned in a frame with the surfaces of one angled at 6 degrees with respect to the surfaces of the other and with the aluminum coated face of the rear glass or member mounted forwardly toward the titanium dioxide coated plate which formed as a whole the front mirror means and mirror. Thus the arrangement follows the form of mirror construction as shown in Figure 12. The mirror provides a choice of multiple image intensities, the first being of 43% coming from the front mirror means comprising the two titanium dioxide layers and the glass support member. The second image was of 28.9% and the third image was of 10.4%, the latter being formed by internal reflection within the prism form. While the images numbers one and three are composite, the use of these mirror images was without any appreciable noticeable haziness and to all practical purposes the images are single images. A fourth image of 3.6% was also provided.

Example 7

A clean piece of thin relatively parallel faced smooth plate glass of rear view mirror size was coated on one surface by thermal deposition in high vacuum and subsequent oxidation after removal from the vacuum, with a multiple layered coating of non-light-absorptive reflective nature made up of three successive coatings in intimate contact of approximately one-quarter wave length of green-yellow light thickness of titanium dioxide in contact with the glass surface, a one-quarter wave length of blue light thickness of quartz deposited upon the titanium dioxide layer, and a third layer upon the quartz of a one-quarter wave length of green-yellow light thickness of titanium dioxide. A second piece of similar shape and size of plate glass was coated with an aluminum coating by thermal evaporation giving such piece of glass a reflectivity of 85%. These coated glass plates were then adjacently positioned in fixed position in a frame with the surfaces of one angled at 7 degrees with respect to the surfaces of the other with the aluminum coated surface mounted forwardly and toward the uncoated surface of the front glass plate or member which thus presented the face with the multiple coating upon it as the exterior face or front of the mirror. The mirror in use as a rear view mirror gave a first image of 40% from the front surface or multiple coated front glass, a second image of 30.6%, and a third image which came from internal reflection within the prism form of 10.4%, and a fourth image of 3.5%.

Examples 8 and 9

Two glass wedges of small angle between the two flat faces were coated in a vacuum chamber with the same multiple layered coating as described in Example 7 so as to produce upon one face of each a coating having 40% reflection. The other face was in each case coated with a partially transparent coating of chromium by thermal evaporation so that a rear reflector surface of 40% and 50% were respectively formed. These chromium coated surfaces were then coated with a black paint to block all possible vision through the coated product. With the transparent multiple interference coating as the front mirror, these mirrors showed successive images respectively as follows: 40%, 14.4%, 2.5%, and 0.4%; and 40%, 18.0%, 3.6%, and 0.7%, which were very useful automobile driving ranges.

Example 10

A reflecting coating of a single layer of titanium dioxide of a suitable thickness to provide a 32% reflection which was substantially colorless was formed upon the one face of a small prism shaped wedge having a four degree angle and of a shape suitable to use as an automobile rear view mirror. This coating was preferably formed by thermal evaporation in a vacuum chamber. The other or rear face of this mirror was then coated with an opaque mirror coating of lead sulfide by chemical deposition or by thermal evaporation. Mounted in a frame permitting slight angular adjustment, the mirror provided in sequence images of 32%, 14%, 1.3%, and 0.1%.

*Example 11*

A clean piece of thin relatively parallel faced smooth plate glass of rear view mirror size was coated, by thermal deposition in high vacuum and subsequent oxidation after removal from the vacuum, on one surface only with a multiple layered coating of non-light-absorptive reflective nature made up of three successive coatings of approximately one-quarter wave length of green-yellow light thickness each of titanium dioxide, quartz and titanium dioxide. One of the titanium dioxide layers was in contact with the glass surface and all of the layers were in intimate contact. On the other surface of the same glass a coating of titanium dioxide only was formed in similar manner which was of a thickness of 0.14 wave lengths of green-yellow light. A second clean piece of plate glass of similar size and shape was coated by thermal evaporation with a coating of gold giving such piece of glass a reflectivity of 80%. These coated plates were then adjacently positioned in a frame with the surfaces of one angled at 5 degrees with respect to the surfaces of the other to form a prism. The gold coated plate was arranged as the rear member with the gold coated face mounted forwardly toward the single titanium dioxide coated surface of the other plate which acted as the front member of the mirror. Thus the multiple coated face of the forward member was the face of the completed mirror. This multiple coating upon the front glass plate member and the single coating upon the rear of such glass front member all acted cooperatively as a front mirror reflective means or front mirror giving from such front mirror a first image of 55%. The other images provided by the assembled prism form mirror were 16% as the second image, 7.1% as the third image formed by the first internal reflection within the prism form, and 3.0% as a fourth image. The selective color reflection properties of the gold rear reflective mirror means as well as light interference effects arising in the front mirror means gave to the mirror different colors in the three images of the different intensities given. Each of the images was for practical driving use a single image and when the mirror was mounted in the car in a frame providing simple angular adjustment each of the images could be selectively brought to the driver's eyes to provide a desired visibility and glare reduction.

*Examples 12 and 13*

On the front faces of two wedges of glass of four degrees between faces, there was produced by coating in a vacuum chamber a partially transparent coating having a forward or face reflectivity of 70%. The coating substantially transmitted the other 30% of the incident light. The coating was formed by alternate deposition of four layers of quarter wave length thicknesses of magnesium fluoride and titanium dioxide by thermal evaporation within a high vacuum. On the back face of one of these wedges a coating of partially transparent chromium capable of reflecting 50% was deposited and this was then painted with a paint to make the structure opaque. This mirror provided images in successive angulated positions of 70%, 4.0%, 1.5%, and 0.5%. The other wedge was coated on the back with a thermally deposited opaque layer of aluminum. This mirror provided a selection of successive images suitable to various automobile driving conditions of 70%, 8.0%, 5.0%, and 3.6%.

As will be apparent from the foregoing description, the mirror comprises front and rear mirror reflecting means. The front mirror reflecting means as illustrated in the several different embodiments may be provided on the front surface of a glass prism, on the front surface of a plane glass plate, on the rear surface of a plane glass plate, or it may be produced by mirror films provided on both the front and rear surfaces of a front glass plate. In like manner, the rear mirror reflecting means may be provided by a reflective mirror film or coating deposited on the rear surface of a glass prism, on the front surface of a plane glass plate, on the rear surface of a plane glass plate, or it may be provided by films deposited on both the front and rear surfaces of a plane rear glass plate.

The portion of the rear view mirror between the front mirror surface and the rear mirror surface is transparent. In the case of a solid prism this means that the material of which the prism is composed is transparent. In the case of mirrors formed by angularly disposed plates each provided with mirror reflective films or coatings, this language means that any portion of the structure which lies intermediate the films is transparent. As will of course be apparent, if the front mirror reflective means is provided on the rear surface of a front plane plate, this plate will also necessarily be transparent. Thus, for example, in the case of a mirror formed of angularly disposed plates, the rear plate, if provided with a mirror reflective film or coating on its front face, may if desired be opaque.

In order to produce clear reflected images without interference it is necessary that the several images are reflected along divergent paths which are sufficiently separated at the driver's position so that only a single image is visible to the driver at one time. Therefore by employing the multiple position support it is possible for the driver to obtain the full effectiveness of any selected one of the several images by simple manipulation of the supporting means.

Figures 5 to 7, 14 and 15, which show the paths of incident and reflected rays, are intended to be diagrammatic only and to show the direction rather than the amount of angular divergence of the rays. No effort has been made to indicate the effect of refraction which in general will increase the divergence of the several reflected rays.

Obviously, if preferred the use of the images beyond the first two may be foregone simply by installing the mirror in a frame angularly adjustable to two positions only to focus the first and second images only to the driver's eyes, such use of only two images leading to a slightly cheaper type of support. In such a two-image use it will be apparent that all the mirrors of this invention may be applied, it being apparent that in such use my mirrors may be installed in presently available two-position frames for prismatic mirrors.

The drawings and the foregoing specification constitute a description of the improved prismatic rear view mirror device in such full, clear, concise and exact terms as to enable any person skilled in the art to practice the invention, the scope of which is indicated by the appended claims.

I claim:
1. A multiple position rear view vehicular mirror producing separate individual images, all of the images produced by said mirror being arranged in successive angularly located positions and of progressively different light intensities, said mirror being tiltable to effect simultaneous angular movement of all of said images to displace one of said images from, and to bring another selected image into, the driver's field of view, said images providing in sequence respectively a high light intensity image for day driving, a lower light intensity image for normal night driving, and a still lower light intensity image for night driving under abnormal glare conditions, said mirror comprising a support of prism form having front and rear supporting surfaces at an angle to each other and with the portion of said support between said surfaces being transparent, semi-transparent front mirror means on said front surface directly reflecting as the first image in the sequence said high intensity image for day driving, said front mirror means having substantially equal internal and external reflectivities of not substantially less than 40% but not substantially more than 70% of the incident light, rear mirror means on said rear surface having a reflectivity of over 30% and reflecting light transmitted by the front mirror means, the reflectivity and light transmission of the front mirror means being selected in accordance with the reflectivity of said rear mirror means to cause said front and rear mirror means to cooperate to produce in sequence said lower light intensity image for normal night driving and said still lower light intensity image for night driving under abnormal glare conditions, said rear mirror means reflecting light transmitted by the front mirror means back through the front mirror means to provide the image for normal night driving, said image for normal night driving having an intensity substantially less than the intensity of the image for day driving but substantially greater than the intensity of the image for night driving under abnormal glare conditions, the image for night driving under abnormal glare conditions being produced by light transmitted through the front mirror means and reflected internally between the front and rear mirror means and then transmitted forwardly through the front mirror means in an intensity range of substantially 1% to 12% of the light incident on the front mirror means, the image for normal night driving being located between the images for day driving and night driving under abnormal glare conditions to provide for tilting of said mirror from normal night driving position to the position for night driving under abnormal glare conditions without bringing the high intensity image for day driving within the driver's field of vision.

2. A mirror as defined in claim 1 in which said front mirror means comprises a film of a metal oxide.

3. A mirror as defined in claim 1 in which said rear mirror means comprises a film of metal.

4. A mirror as defined in claim 1 in which said front mirror means comprises a film of metal oxide and said rear mirror means comprises a film of metal.

5. A mirror as defined in claim 1 in which said front mirror means includes a film comprising titanium dioxide.

6. A mirror as defined in claim 1 in which said front mirror means includes a film comprising titanium dioxide and said rear mirror means comprises a film of metal.

7. A mirror as defined in claim 1 in which said front mirror means comprises a film of multiple layers of material of alternately high and low index of refraction.

8. A mirror as defined in claim 1 in which said rear mirror means comprises a film of multiple layers of material of alternately high and low index of refraction.

9. A mirror as defined in claim 1 in which said front mirror means comprises a film of multiple layers of material of alternately high and low index of refraction and in which said rear mirror means comprises a film of metal.

DWIGHT W. BARKLEY.

REFERENCES CITED

The following references are of record in the file of this patent:

UNITED STATES PATENTS

| Number | Name | Date |
|---|---|---|
| 1,808,740 | Wetherbee | June 2, 1931 |
| 1,949,138 | Bell | Feb. 27, 1934 |
| 2,321,987 | Brown | June 15, 1943 |
| 2,397,947 | Colbert | Apr. 9, 1946 |
| 2,430,452 | Colbert et al. | Nov. 11, 1947 |
| 2,455,818 | Sherts | Dec. 7, 1948 |

FOREIGN PATENTS

| Number | Country | Date |
|---|---|---|
| 362,622 | Great Britain | Dec. 10, 1931 |